Figure 1:
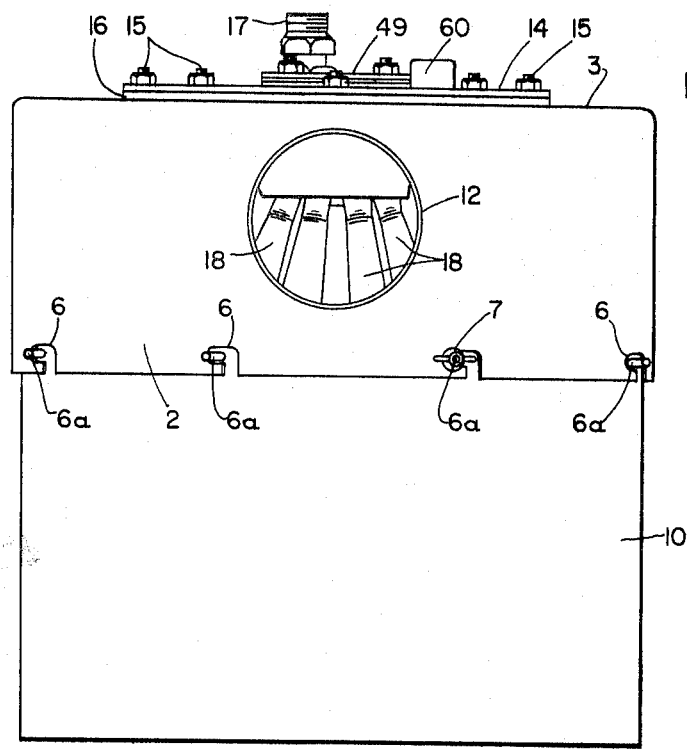

INVENTORS
JESSE TALBOT RYMER
STANLEY PAUL WITCHELL.
BY
*Silverman & Cass*
ATTYS.

INVENTORS
JESSE TALBOT RYMER
BY STANLEY PAUL WITCHELL.
Silverman & Cass
ATTYS

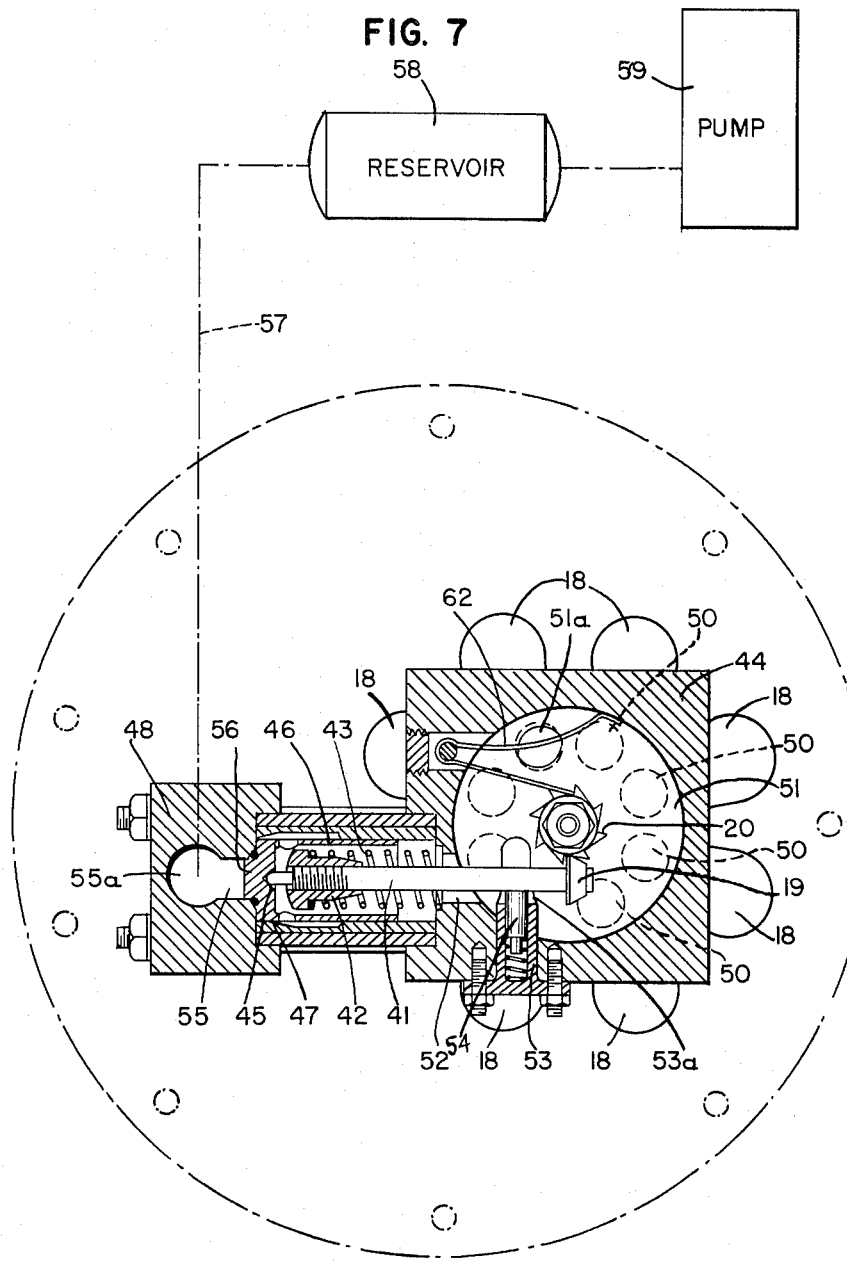

Feb. 15, 1966   J. T. RYMER ET AL   3,234,714
FILTERING SYSTEMS AND FILTERS FOR USE THEREIN
Filed Jan. 30, 1963   4 Sheets-Sheet 4

INVENTORS
JESSE TALBOT RYMER
STANLEY PAUL WITCHELL
BY
*Silverman & Cass*
ATTYS.

United States Patent Office 3,234,714
Patented Feb. 15, 1966

3,234,714
FILTERING SYSTEMS AND FILTERS
FOR USE THEREIN
Jesse Talbot Rymer, Nailsworth, and Stanley P. Witchell, Llanfoist, England, assignors to Coopers Mechanical Joints Limited, Abergavenny, England
Filed Jan. 30, 1963, Ser. No. 255,059
8 Claims. (Cl. 55—294)

This invention relates to filtering systems for fluids, particularly for air and other gases, and to filter elements for use in such filtering systems.

In British patent specification 880,043, issued October 18, 1961, gas cleaning apparatus is described in which a number of independent filter elements are arranged in parallel to deliver cleaned gas to a common receiver, such as an air inlet of an internal combustion engine, and mechanism is provided for delivering pulses of compressed gas into the filter elements, in the reverse direction to the normal flow, for the purpose of cleaning the filter elements. By these means the filter elements are, for practical purposes, prevented from becoming clogged almost indefinitely. A principal object of the present invention is to enable this apparatus to be constructed in a more compact form than has previously been possible.

According to the invention, a filter element for use in a filtering system for the removal of impurities from fluids, includes a pervious wall through which the fluid passes to deposit the impurities on one face of the wall, and a number of ducts covering and opening onto the opposite face of the wall so as simultaneously to receive the fluid and deliver it to an outlet location on the element, the ducts being arranged also to receive fluid pulses at the said location and to deliver them, in the reverse direction to the normal fluid flow, to the associated areas of wall and thereby cleanse the wall of the impurities. Advantageously, the pervious wall is in the form of a tubular member formed with radially spaced longitudinally extending pleats moulded at their ends into caps, and the ducts consist of scoops distributed around the filter element and extending from one cap to the other, the scoops being open to the pervious wall along their lengths and open at one end but closed at the other end. Each scoop is arranged to scoop in the fluid pulses for cleaning the area of the pervious wall associated with its respective scoop, and to deliver filtered gas or other fluid from the said area to the outlet location on the filter element. Preferably the ducts are distributed around the inside of the tubular member and are tapered so that their cross-sectional area diminishes continuously from their open ends to their closed ends. Each scoop may then have a U-shaped cross-section with its limbs extending between pairs of the pleats. The pleated tubular member may be in the form of a generally circular, untapered cylinder.

The invention also includes a filtering system for fluids, particularly gas, incorporating the aforesaid filter element. Clearly it is desirable for the pulses of compressed gas to be delivered in rotation to the scoops so as to avoid any serious interruption in the normal flow of filtered gas. One way of doing this is to provide as many nozzles as there are scoops, one nozzle being allocated to each scoop and the compressed gas being delivered in succession to the scoops. Then the nozzles may be arranged in a cluster mounted in a manifold which receives the cleaned gas from the filter element, the outlet aperture of each nozzle being substantially smaller than the area of the adjacent mouth of the associated scoop.

Other objects and advantages will occur to those skilled in the art to which this invention pertains as a detailed description thereof appears hereinafter.

Figure 2:
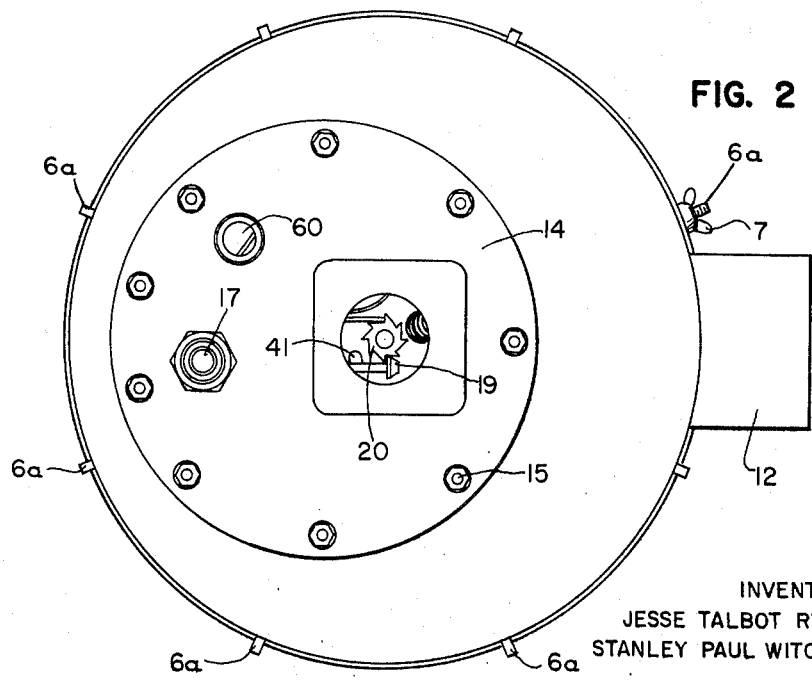
Figure 3:
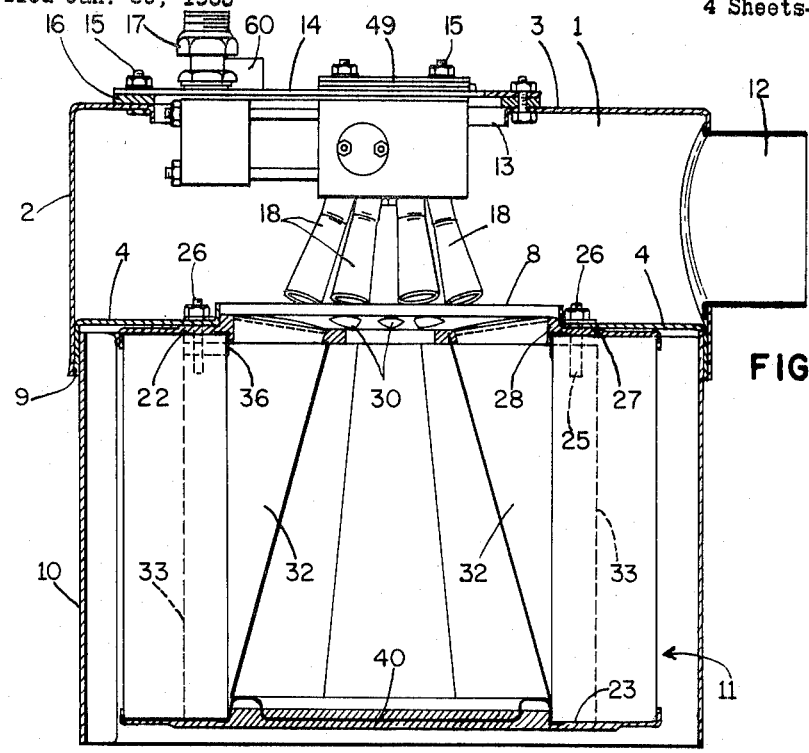
Figure 4:
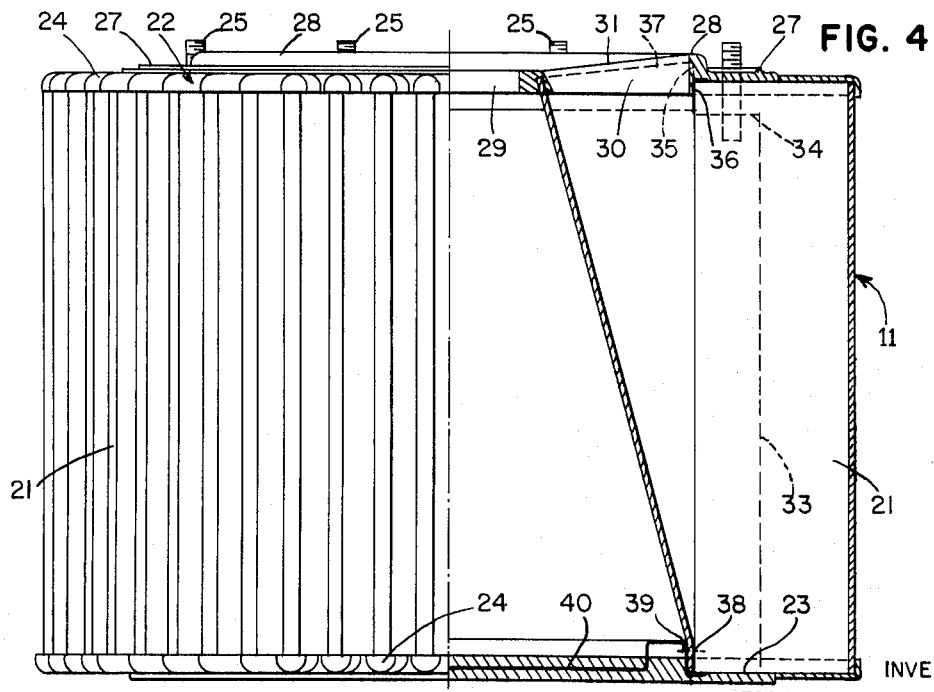
Figure 5:
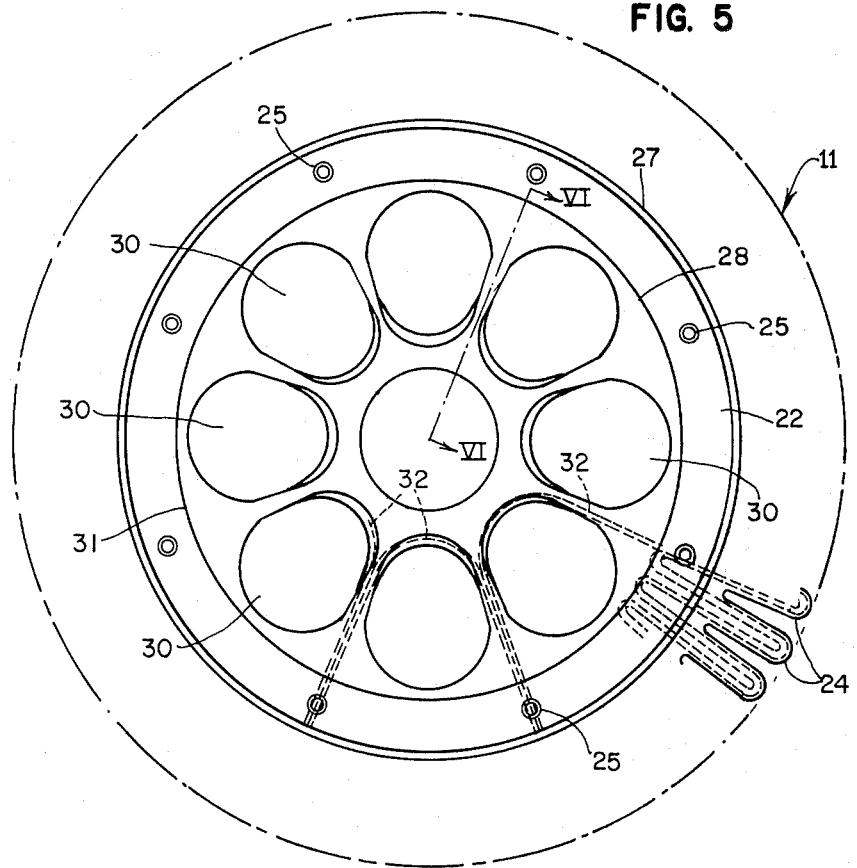
Figure 6:
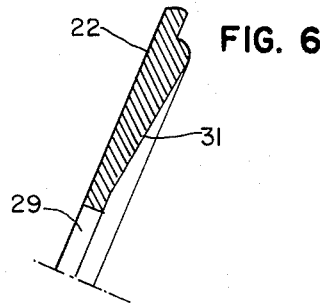

In order that the invention may be clearly understood and readily carried into effect, a filtering system in accordance therewith will now be described, by way of example, with reference to the accompanying drawings, in which:

FIGURE 1 is a front elevation of the air cleaner,
FIGURE 2 is a plan view of the air cleaner,
FIGURE 3 is a sectional side elevation of the air cleaner,
FIGURE 4 is an elevation of a filter element forming part of the filtering system of FIGURES 1 to 3, the right side of the filter element being shown in section,
FIGURE 5 is a plan view of the filter element on FIGURE 4,
FIGURE 6 is a section on the line VI—VI in FIGURE 5; and
FIGURE 7 is a sectional plan of mechanism in the air cleaner of FIGURES 1 to 3.

The upper portion of this air filtering system comprises a circular manifold 1 having a cylindrical side wall 2 with an integral top wall 3 and closed at the bottom by a flanged plate 4, secured to the wall 2 permanently in an airtight condition by a flange 9. The flanged plate 4 is formed with a comparatively large central opening 8. The flange 9 and the surrounding portion of the wall 2 are formed with bayonet slots 6 that receive pins 6a on a vertical cylindrical skirt 10. A wing nut 7 on one of the pins 6a locks the skirt in position. A cylindrical filter element 11 is mounted within the skirt 10, the filter element 11 being attached to the flanged plate 4.

An outlet duct 12 from the manifold 1 is fixed to the wall 2. In practice the duct 12 is connected to an air inlet of an internal combustion engine, which draws air from the space between the skirt 10 and filter element 11, then through the filter element 11 and the opening 8 into the manifold 1 and subsequently through the duct 12.

The top wall 3 of the manifold 1 is formed with an opening 13 closed by a plate 14 carrying cyclically operating automatic mechanism for supplying cleaning pulses of compressed air to successive segments of the filter element. The plate 14 is secured by nut and bolt assemblies 15, with an intervening gasket 16.

The mechanism carried by the plate 14 operates as described in detail below with reference to FIGURE 7 and also substantially in the way described in the aforesaid British patent specification. The function of the present mechanism is two-fold, in that, during each automatic cycle, a pulse of compressed air is delivered through a selected one of eight nozzles 18, and a pawl 19 (FIGURE 2) operates a ratchet wheel 20 so as to turn a valve disc through an eighth of a revolution to select the next nozzle to deliver a pulse of compressed air. The primary difference between the present arrangement and that described in the aforesaid British specification is that the nozzles 18 are arranged in a circular cluster coaxial with the filter element 11, instead of at the ends of comparatively long pipes leading respectively to as many separate filter elements.

The active portion of the filter element 11 consists of a tubular member in the form of a cylinder 21 having a pleated wall of tightly woven wool which may have nylon added. This woolen fabric may be stiffened by being sandwiched between layers of wire gauze. There are fifty-six pleats, and the top and bottom of the cylinder 21 are moulded respectively into top and bottom caps 22, 23 made of a synthetic plastic material. The outer peripheral portion of each cap 22, 23 is moulded into the form of fifty-six radial fingers 24 which respectively receive the radially outermost portions of the top and bottom ends of the pleats. Eight studs 25 are moulded into the top cap 22 and these project through holes in the flanged plate 4 so as to receive nuts 26 and enable the filter element 11 to be clamped to the plate 4. So as to prevent air from finding its way between the top of the cap 2 and the plate 4, the cap 22 is formed with an annular beading 27, which bears against the plate 4, and with a circular shoulder 28 that fits in the opening 8. The portion of the cap 22 within the circular shoulder 28 constitutes the outlet location of the filter element. The centre of the cap 22 is formed with an aperture 29 and the top surface of the cap 22 between the shoulder 28 and aperture 29 is formed substantially as the frustum of a cone. Around this frusto-conical surface 31 the cap 22 is formed with eight openings 30. The nozzles 18, which are located axially above the openings 30, are arranged respectively to deliver the air pulses through these openings. It will be observed that the nozzles 18 are expanding nozzles so that some of the kinetic energy of the pulses is converted into pressure energy which enables the pulses to penetrate the air between the nozzles 18 and cap 22 and then find their way to portions of the pleated filter material 21 through eight scoops 32 now to be described.

Each scoop 32 has a U-shaped horizontal cross-section with its inner curved surface tapering in a radially outward direction from top to bottom of the filter element, as shown in FIGURES 3 and 4. Along the major portion of its length, each scoop has the edges of its two limbs lying on vertical lines 33 which are located between pleats, seven pleats being embraced by the scoop. The limbs of each scoop are in contact with the limbs of the two adjacent scoops as shown in FIGURE 5, so that the whole of the filter cylinder 21 is covered internally by the eight scoops 32. The tops of the limbs of each scoop are recessed from the vertical edges 33 as shown at 34 in FIGURE 4 so as to provide vertical edges 35 that are embraced by a vertical, annular metal flange 36 secured to the cap 22. The top edge 37 of each scoop 32 is moulded into the cap 22 around the associated one of the openings 30.

Thus each opening 30 constitutes the mouth of the associated scoop, and it will be seen that the outlet end of each nozzle 18 is substantially smaller than the area of the adjacent mouth 30.

The bottom of the curved surface of each scoop merges into an arcuate flange 38 which is welded to a vertical cylindrical limb 39 on a member 40 moulded onto the lower cap 23.

It will be noted that the cap 23 and member 40 provide a strong imperforate barrier preventing air from flowing straight through the centre of the filter element.

Normally the filtered air passes upwards through all the scoops 32 and through the openings 30 into the manifold 1, but the aforesaid pulses of scavenging air in the reverse direction are delivered into the scoops in rotation so that the pleats associated with each scoop periodically receive pulses of air on their inner surfaces which dislodge dust, grit or other finely divided particles that are deposited outside the pleats as a result of the normal air flow. Any filtered air that happens to find its way between the scoops 32 passes through the apertures 29 into the manifold 1.

The filter element shown in FIGURES 4 and 5, which is drawn to scale, has a diameter of twelve and 3-quarter inches and is suitable for a large road vehicle or diesel locomotive, or for use on heavy earthmoving or road-building equipment.

Referring now in greater detail to the mechanism for delivering the pulses of scavenging air in succession to the nozzles 18, it will be seen from FIGURE 7 that the pawl 19 is fixed at one end of a rod 41, to which is fixed an abutment member 42 for one end of a compression spring 43, the other end of which bears against a fixed casing 44. Thus, the outer end of the rod 44 is maintained by the spring 43 in a central recess 45 inside the crown of a hollow piston 46. Also, when permitted to do so, the spring 43 keeps the piston 46 at the outer end of cylinder 47 mounted between the casing 44 and a cap 48. The casing 44 contains a cylindrical recess closed at the top by a plate 49 (FIGURES 1 and 3, but not shown in FIGURE 2) and, at the bottom, by a web formed with ports 50 communicating respectively with the nozzles 18. The valve disc 51, fixed to the ratchet wheel 20, bears on this web and is formed with a port 51a that is brought in succession into register with the ports 50.

The rod 41 passes with substantial clearance through an opening 52 in the side of the casing 44 and through slots 53a in a member 53 fixed in the casing 44. A spring-loaded plunger 54 tends to hold the rod 41 against the inner ends of the slots 53a.

The cap 48 is formed with an inlet duct 55a communicating with a port 55 which is closed by a frusto-conical projection 56 on the piston 46 when the piston is at its outermost position. The duct 55a terminates in a terminal 17 (FIGURES 1 to 3) connected by a pipe 57 (FIGURE 7) to a reservoir 58 fed continuously by pump 59 driven continuously by the engine that receives the air cleaned by the air cleaner. The inlet air for the pump is clean air received through a pipe (not shown) from the manifold 1, the pipe being connected to a terminal at 60.

When the pressure in the reservoir 58 reaches a predetermined value, the pressure on the frusto-conical projection 56 is sufficient to overcome the spring 43, and move the piston 46 inwardly. This permits the air pressure to act on the full piston area and consequently move the piston 46 against the increasing spring stress to the required amount, while the compressed air leaks along grooves in the inner wall of the cylinder 47, through ports in the hollow piston 46 and through the opening 52 to the casing 44, whence the air blast escapes through the port 51a and the one of the ports 50 that is in register with the port 51a to provide the required pulse of scavenging air.

During this phase of the operation, a detent spring 62 prevents reverse movement of the ratchet wheel 20, while the pawl 19, loaded laterally by the plunger 45, snaps past one of the ratchet teeth. When the pressure in the reservoir 58 falls sufficiently to allow the spring 43 to return the piston 46 to the position of FIGURE 7, the pawl 19 acts on the aforesaid ratchet tooth to bring the port 51a into register with the next port 50. The pressure in the resrevoir 58 then builds up once more and the cycle is repeated.

From the above detailed description, it will be seen that the invention is capable of considerable variation without departing from the spirit or scope of the invention as defined in the appended claims. Such claims are intended to be liberally construed.

We claim:

1. A filter element for use in a cleaner for the removal of impurities from a fluid stream, said element comprising, in combination, a tubular member consisting of a continuous pervious wall formed with radially spaced longitudinally extending pleats, two caps molded respectively to the ends of said tubular member to cover the ends of said pelats, and a plurality of scoops distributed around said tubular member so as to cover one face thereof, each of said scoops extending longitudinally from one of said caps substantially to the other of said caps, said scoops being open to said wall along its length for communication therebetween, and each of said scoops being open at one end and closed at the other end.

2. A filter element according to claim 1, in which said scoops are distributed around the inside of said tubular member.

3. A filter element according to claim 1, in which said scoops are tapered so that their cross-sectional area diminishes continuously from their open ends to their closed ends.

4. A filter element for use in a filtering system for the removal of impurities from a fluid stream, said element comprising, in combination, a tubular member consisting of a continuous pervious wall formed with radially spaced, longitudinally extending pleats distributed around said walls, a first cap molded to one end of said tubular member with peripheral portions of said cap covering said pleats, said cap being formed with a plurality of openings distributed in said cap, said openings being spaced radially inwardly of said peripheral portions, a second cap molded to the other end of said tubular member so as to cover said pleats and to close said other end of said tubular member, and a plurality of scoops distributed around said tubular member so as to cover the inside face thereof, each of said scoops extending from an associated one of said openings in said first cap substantially to said second cap, and each of said scoops being open to said wall for communication therewith along its length.

5. A filter element according to claim 4, in which each of said scoops is tapered so that its cross-sectional area diminishes substantially continuously from the associated one of said openings to said second cap.

6. A filter element according to claim 4, in which each said scoop has a U-shaped cross-section with each limb of the U extending between adjacent pleats.

7. A filtering system comprising, in combination, a conduit for fluid, said conduit constituting a manifold, a filter element having a pervious wall through which the fluid can pass to deposit impurities on one face of said wall, and a plurality of longitudinally extending ducts in constant communication with the opposite face of said wall so as to receive the fluid respectively from associated areas of said wall and to deliver the fluid into said manifold, a cluster of nozzles mounted in said manifold for the delivery of pulses of fluid into said ducts to cleanse said wall of impurities, said nozzles and said ducts being equal in number and the outlet aperture of each nozzle being substantially smaller than the intake area of the end of the duct into which the pulses are delivered, valve means rotatable for sequentially establishing communication between each of said nozzles and its associated duct and mechanism for actuating said valve means.

8. A filtering system comprising, in combination, a conduit for fluid, said conduit constituting a manifold, a filter element mounted adjacent said manifold and having a tubular member consisting of a continuous pervious wall formed with radially spaced longitudinally extending pleats distributed around said wall, a first cap molded to one end of said tubular member with peripheral portions of said cap covering said pleats, said cap having a plurality of openings distributed around said cap, said openings being located radially inwardly of said peripheral portions, a second cap molded to the other end of said tubular member so as to cover said pleats and to close said other end of said tubular member, and a plurality of longitudinally extending scoops distributed around said tubular member so as to cover the inside face thereof, each of said scoops extending substantially from said second cap to an associated one of said openings in said first cap to deliver cleaned fluid through said opening into said manifold, each of said scoops being open to said wall along its length for direct communication therewith, a cluster of nozzles mounted in said manifold, said nozzles being positioned above said openings and in alignment therewith for the delivery of pulses of fluid through said openings into said scoops to cleanse said wall of impurities, said nozzles and said ducts being equal in number, and the outlet aperture of each of said nozzles being substantially smaller than the area of the adjacent opening, valve means rotatable for sequentially establishing communication between each of said nozzles and its associated duct and mechanism for actuating said valve means.

References Cited by the Examiner

UNITED STATES PATENTS

| 2,500,747 | 3/1950 | Ellis | 55—302 |
| 2,962,121 | 11/1960 | Wilber | 55—498 |
| 2,980,207 | 4/1961 | Allen | 55—302 |

FOREIGN PATENTS 880,043   10/1961   Great Britain.

OTHER REFERENCES

German printed application No. 1,072,459, December 1959.

ROBERT F. BURNETT, *Primary Examiner.*

HARRY B. THORNTON, *Examiner.*